(12) United States Patent
Uehara et al.

(10) Patent No.: US 11,316,202 B2
(45) Date of Patent: Apr. 26, 2022

(54) SECONDARY BATTERY

(71) Applicants: SANYO Electric Co., Ltd., Daito (JP); Panasonic Corporation, Kadoma (JP)

(72) Inventors: Yukitoshi Uehara, Aichi (JP); Kouhei Tuduki, Hyogo (JP); Yoshikazu Miyachi, Hyogo (JP); Shinya Miyazaki, Hyogo (JP)

(73) Assignees: SANYO Electric Co., Ltd., Daito (JP); PANASONIC CORPORATION, Kadoma (JP)

( * ) Notice: Subject to any disclaimer, the term of this patent is extended or adjusted under 35 U.S.C. 154(b) by 473 days.

(21) Appl. No.: 16/360,637

(22) Filed: Mar. 21, 2019

(65) Prior Publication Data

US 2019/0305375 A1 Oct. 3, 2019

(30) Foreign Application Priority Data

Mar. 30, 2018 (JP) .............................. JP2018-069821

(51) Int. Cl.
*H01M 10/0569* (2010.01)
*H01M 4/583* (2010.01)
*H01M 4/48* (2010.01)
*H01M 4/36* (2006.01)
*H01M 4/02* (2006.01)

(52) U.S. Cl.
CPC ....... *H01M 10/0569* (2013.01); *H01M 4/366* (2013.01); *H01M 4/48* (2013.01); *H01M 4/583* (2013.01); *H01M 2004/021* (2013.01); *H01M 2004/027* (2013.01); *H01M 2220/20* (2013.01)

(58) Field of Classification Search
CPC .... H01M 10/0569; H01M 4/583; H01M 4/48; H01M 4/366; H01M 2220/20; H01M 2004/021; H01M 2004/027
See application file for complete search history.

(56) References Cited

U.S. PATENT DOCUMENTS

2016/0329557 A1   11/2016   Sugimori et al.

FOREIGN PATENT DOCUMENTS

| JP | 2003-331828 A | 11/2003 |
| JP | 2015-232921 A | 12/2015 |
| JP | 2017-130418 A | 7/2017 |
| WO | 2015098021 A1 | 7/2015 |

*Primary Examiner* — Sarah A. Slifka
(74) *Attorney, Agent, or Firm* — Westerman, Hattori, Daniels & Adrian, LLP

(57) ABSTRACT

A secondary battery having a suppressed decrease in capacity, even through rapid charging, includes: a positive electrode; a negative electrode including a negative electrode current collector and a negative electrode active material layer formed thereon containing a carbon material and silicon compounds; and an electrolyte solution containing nonaqueous solvents including 10 volume % or more of fluoroethylene carbonate. When: a surface of the negative electrode active material layer that faces the negative electrode current collector and the back side thereof are set as first and second surfaces, respectively; a thickness of the negative electrode active material layer is set as T; and regions from the first and the second surfaces to a depth of 0.5T are set as lower and upper layer portions, respectively, mass M1 of the silicon compounds in the lower layer portion is larger than mass M2 of the silicon compounds in the upper layer portion.

7 Claims, 2 Drawing Sheets

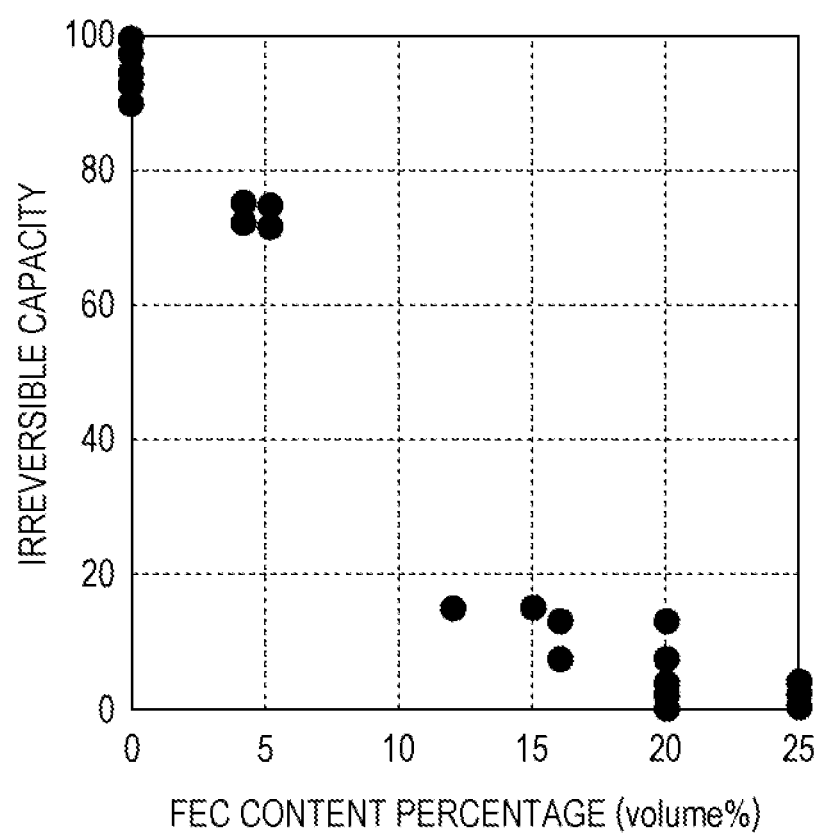

SECONDARY BATTERY

CROSS REFERENCE TO RELATED APPLICATIONS

The present invention application claims priority to Japanese Patent Application No. 2018-069821 filed in the Japan Patent Office on Mar. 30, 2018, the entire contents of which are incorporated herein by reference.

BACKGROUND OF THE INVENTION

Field of the Invention

The present disclosure relates to a secondary battery.

Description of Related Art

Due to high voltage and high energy density, non-aqueous electrolyte secondary batteries, especially lithium-ion secondary batteries, are anticipated to be utilized for small consumer applications, power storage devices, and power sources of electric vehicles.

In particular, secondary batteries used as driving power sources of electric vehicles (EV), hybrid electric vehicles (HEV, PHEV), and the like, as well as power sources of electronic devices, are required to be capable of supplying more power to devices more rapidly.

As an even greater high energy density of a battery is desired, a material containing silicon that is to be alloyed with lithium is anticipated to be employed as a negative electrode active material having a high theoretical capacity density.

Japanese Published Unexamined Patent Application No. 2003-331828 (Patent Document 1) discloses a secondary battery having a negative electrode energy density enhanced by incorporating silicon into the negative electrode active material layer based on a carbon material as a negative electrode active material so that more power can be supplied.

BRIEF SUMMARY OF THE INVENTION

According to a secondary battery disclosed in Patent Document 1, it becomes possible to increase energy density and supply more power to devices. Meanwhile, negative electrodes containing silicon have low charge acceptance in rapid charging and tend to decrease the capacity by rapid charging. In recent years, there has been a growing need for further improved durability against rapid charging and discharging of secondary batteries.

An aspect of the present invention relates to a secondary battery including: a positive electrode, a negative electrode, and an electrolyte solution containing one or more nonaqueous solvents, where: the negative electrode includes a negative electrode current collector and a negative electrode active material layer formed on the negative electrode current collector; the negative electrode active material layer contains a carbon material and one or more silicon compounds; the nonaqueous solvents include fluoroethylene carbonate; a volume-based content percentage of fluoroethylene carbonate in the nonaqueous solvents is 10% or more; the negative electrode active material layer has a first surface facing the negative electrode current collector and a second surface being a back side of the first surface; and when: a thickness of the negative electrode active material layer is set as T; a region from the first surface to a depth of 0.5T of the negative electrode active material layer is set as a lower layer portion; and a region from the second surface to a depth of 0.5T of the negative electrode active material layer is set as an upper layer portion, mass M1 of the silicon compounds in the lower layer portion is larger than mass M2 of the silicon compounds in the upper layer portion.

A secondary batter having a suppressed decrease in capacity, even through rapid charging, can be realized.

BRIEF DESCRIPTION OF THE SEVERAL VIEWS OF THE DRAWINGS

FIG. 3 is a graph showing a relationship between the content of fluoroethylene carbonate (FEC) in nonaqueous solvents and irreversible capacity arising through rapid charging.

DETAILED DESCRIPTION OF THE INVENTION

Figure 1:
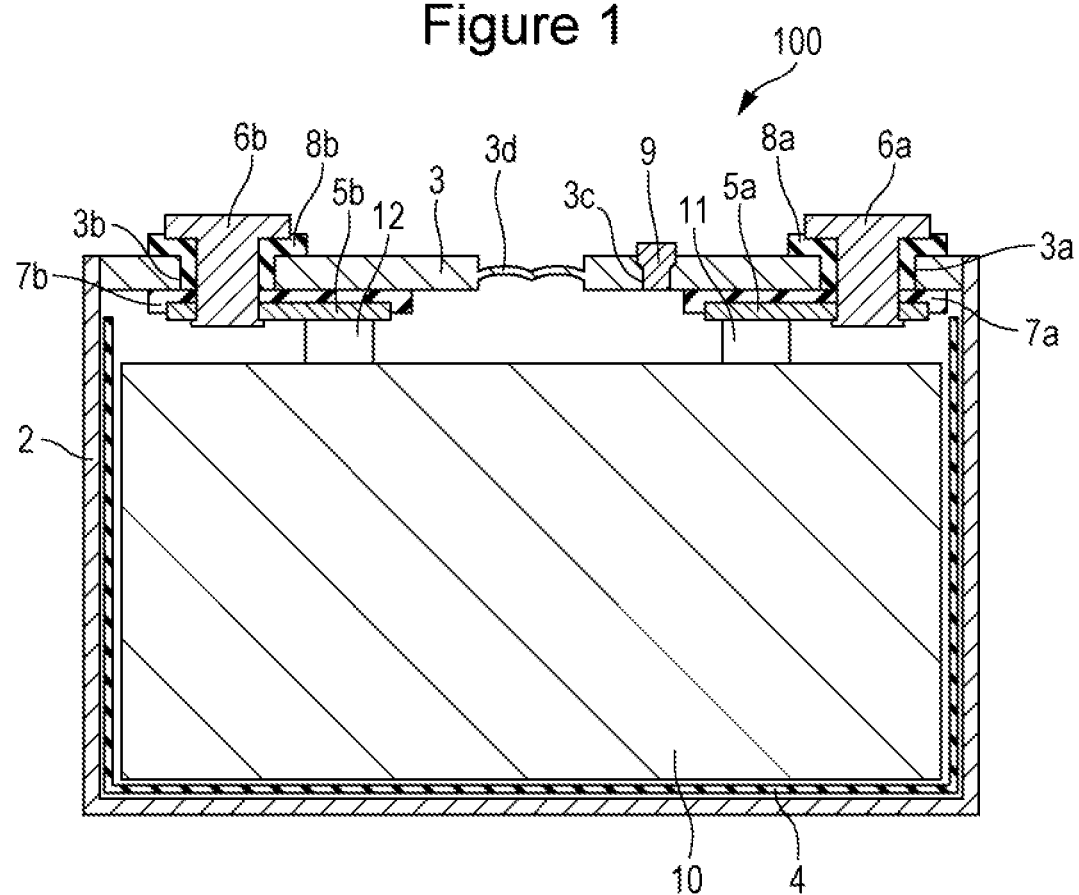
FIG. 1 is a schematic cross-sectional view illustrating the configuration of a secondary battery according to an embodiment of the present invention.

A secondary battery according to the aspect of the present invention includes a positive electrode, a negative electrode, and an electrolyte solution containing nonaqueous solvents. The negative electrode includes a negative electrode current collector and a negative electrode active material layer formed on the negative electrode current collector. The negative electrode active material layer contains a carbon material and silicon compounds. The nonaqueous solvents include fluoroethylene carbonate, and the volume-based content percentage of fluoroethylene carbonate in the nonaqueous solvents is 10% or more. Further, in the negative electrode active material layer, the content of silicon compounds is distributed in the thickness direction, and a mass-based content percentage of silicon compounds on the side not facing the negative electrode current collector is smaller than a mass-based content percentage of silicon compounds on the side facing the negative electrode current collector.

Such a configuration enhances charge acceptance during rapid charging, and a secondary battery having a suppressed decrease in capacity, even in rapid charging, can be realized. The reasons are not limited to the following, but are presumably as follows.

According to the present invention, first, in a secondary battery in which a composite material of a carbon material and silicon compounds is used as a negative electrode active material, a content percentage of the silicon compounds in the composite material is decreased on the front surface (outer surface) side of the negative electrode active material layer that does not face the negative electrode current collector, relative to the side of the negative electrode active material layer that faces the negative electrode current collector. Consequently, high charge acceptance can be maintained, even during rapid charging.

A negative electrode containing a silicon compound as a negative electrode active material tends to form a thick solid electrolyte interphase (SEI) compared with a negative electrode of a carbon material. Accordingly, a large amount of electrolyte solution and electrochemical energy are consumed for SEI formation. As a result, the irreversible capacity increases.

Moreover, charging and discharging are performed through permeation of lithium ions through a SEI as well as through movement of lithium ions into/out of silicon compounds. Accordingly, a SEI is required to have higher lithium permeability as charging and discharging become more rapid. When a thick SEI is formed on the outer surface side of the negative electrode active material layer, a lithium ion permeation rate required for rapid charging cannot be achieved, and further, movement of lithium ions into further inner particles of a negative electrode active material is impeded. Lithium ions whose permeation fails or whose movement is impeded are possibly deposited on a negative electrode surface as metallic lithium and consequently form needle-like crystals (dendrites). Since thus-deposited metallic lithium does not subsequently contribute to the capacity, the discharge capacity after rapid charging decreases (the irreversible capacity increases).

However, in a negative electrode active material layer, a decreased content percentage of silicon compounds on the outer surface side that readily comes into contact with an electrolyte solution results in suppressed formation of a thick SEI film on the outer surface side and a suppressed decrease in capacity, even in rapid charging.

In the embodiment, when a side of the negative electrode active material layer that faces the negative electrode current collector (i.e., a contact surface between a negative electrode active material and the negative electrode current collector) is set as a first surface; a back side of the first surface that does not face the negative electrode current collector (i.e., an outer surface of the negative electrode active material layer) is set as a second surface; a thickness of the negative electrode active material layer is set as T; a region from the first surface to a depth of 0.5T of the negative electrode active material layer is set as a lower layer portion; and a region from the second surface to a depth of 0.5T of the negative electrode active material layer is set as an upper layer portion, a condition (M1>M2) in which mass M1 of silicon compounds in the lower layer portion is larger than mass M2 of silicon compounds in the upper layer portion may be satisfied. By satisfying such a condition, formation of a thick SEI film is suppressed, and a decrease in capacity is suppressed, even in rapid charging. In this case, M2/M1 is, for example, 0.8 or less and may be 0.7 or less. In the above description, when a negative electrode active material layer is formed on each side of the negative electrode current collector, the thickness T of the negative electrode active material layer refers to the thickness on either side.

Second, by including fluoroethylene carbonate (FEC) in nonaqueous solvents, a fine and uniform SEI film can be formed on the surface layer of the negative electrode active material layer. Consequently, permeation resistance of lithium ions during charging and discharging is decreased. Further, a SEI film becomes thin in response to a decrease in the content percentage of silicon compounds on the outer surface side of the negative electrode active material layer that readily comes into contact with an electrolyte solution. As a result, permeation resistance of lithium ions can be decreased too.

During rapid charging, reactions are concentrated near the outer surface of the negative electrode active material layer. However, due to a decreased content percentage of silicon compounds on the outer surface side of the negative electrode active material layer, thin, fine, and uniform films can be formed from a small amount of FEC. Accordingly, film resistance is minimized near the outer surface where reactions are concentrated during rapid charging, thereby decreasing an overvoltage. Consequently, generation of an irreversible capacity can presumably be suppressed. Moreover, excellent film uniformity is also considered to suppress a phenomenon in which an irreversible capacity is increased due to reactions concentrated in thin portions of surface films on negative electrode active material particles. Based on these features, it is considered that permeation resistance of lithium ions may be synergistically decreased, thereby suppressing an increase in irreversible capacity.

In particular, by including, on a volume basis, 10% or more fluoroethylene carbonate (FEC) in nonaqueous solvents, a decrease in capacity after rapid charging is remarkably suppressed.

As in the foregoing, in the present invention, by decreasing the content percentage of silicon compounds on the outer surface side of the negative electrode active material layer that readily comes into contact with an electrolyte solution and by including fluoroethylene carbonate (FEC) in nonaqueous solvents, charge acceptance during rapid charging is enhanced, thereby suppressing a decrease in capacity, even in rapid charging, in a secondary battery that uses a composite material of a carbon material and silicon compounds as the negative electrode active material.

As a method of satisfying the above-mentioned M1>M2 condition and obtaining a negative electrode active material layer having the content percentages of silicon compounds distributed in the thickness direction, for example, a negative electrode material layer may be configured as a multilayer structure composed of a plurality of layers, and the content percentage of silicon compounds in a composite material may be varied for each layer. In this case, the content percentage of silicon compounds may be smaller in a layer nearer the outer surface that comes into contact with an electrolyte solution. In the multilayer structure, a layer that forms an outer surface of the negative electrode active material layer preferably does not contain silicon compounds.

(Negative Electrode Active Material Layer)

The negative electrode active material layer contains a carbon material and silicon compounds. Such a silicon compound is silicon oxide ($SiO_x$), for example. $SiO_x$ has, for example, a structure in which Si fine particles are dispersed in amorphous $SiO_2$. In this case, Si particles may exist in a microcrystalline or amorphous form inside $SiO_2$ base particles. A content ratio x of oxygen to silicon is, for example, $0.5 \leq x < 2.0$ and more preferably $0.8 \leq x \leq 1.5$. In the case of a material having such a structure, peaks due to the presence of Si (microcrystalline Si) are not observed by X-ray diffraction in some cases, but the presence of dispersed Si can be confirmed through observation of cross-sections of $SiO_x$ particles by using a transmission electron microscope (TEM).

As other silicon compounds, lithium silicate may be used, for example. Lithium silicate has a composition formula represented by $Li_ySiO_z$ where $0<y \leq 4$ and $0.2 \leq z \leq 5$ are satisfied. Lithium silicate having a composition formula represented by $Li_{2u}SiO_{2+u}$ ($0<u<2$) is more preferable.

$SiO_x$ may be the above-mentioned lithium silicate (where $Li_{2u}SiO_{2+u}$ ($0<u<2$) is more preferable) dispersed inside $SiO_x$ particles or may have a structure in which Si is dispersed in a lithium silicate phase.

On each $SiO_x$ particle surface, a conductive film formed from a material having a higher conductivity than $SiO_x$ may be formed. As such a conductive film, a carbon film is suitable. The carbon film may be formed at 0.5 to 10 mass % relative to the mass of each $SiO_x$ particle. Exemplary formation methods for a carbon film include a method of mixing coal tar or the like with $SiO_x$ particles, followed by heat treatment and a chemical vapor deposition (CVD) method using a hydrocarbon gas or the like. Further, a carbon film may be formed by fixing to the surface of each $SiO_x$ particle by using a binder such as carbon black or Ketjen black.

The content percentage of silicon compounds in the negative electrode active material layer is 3 to 15 mass %, for example, relative to the total mass of negative electrode active materials containing a carbon material and the silicon compounds. When $SiO_x$ particles having conductive films, such as carbon films, formed thereon are used, the mass of the carbon films is not taken into account as the content percentage of silicon compounds.

As a carbon material, graphite, graphitizable carbon (soft carbon), or non-graphitizable carbon (hard carbon), for example, may be used. Among such carbon materials, graphite is preferable due to excellent stability in charging and discharging as well as low irreversible capacity. Graphite herein means a material having a graphite-type crystal structure and encompasses natural graphite, artificial graphite, graphitized mesophase carbon particles, and so forth. A carbon material may be used alone or in combination. Further, as a carbon material, a carbon composite composed of carbon particles surface-coated with another carbon material, such as amorphous particles, may be used.

An average particle size of a carbon material may preferably be larger than an average particle size of silicon compounds. The average particle size of a carbon material and the average particle size of silicon compounds herein each refer to a volume-average particle size D50 at which a cumulative volume reaches 50% in the particle size distribution obtained by a laser diffraction/scattering method. Specifically, the average particle size D50 of a carbon material is 1 to 30 μm, for example. The average particle size D50 of silicon compounds is 1 to 15 μm, for example. Silicon compounds of such an average particle size have a limited number of cracks. Accordingly, new interfaces that come into contact with an electrolyte solution are less likely to be formed. Consequently, an uneven thickness or a large thickness of a film that covers silicon compounds can be suppressed. Further, the thickness of the negative electrode active material layer may be 50 to 200 μm, and the density of the negative electrode active material layer may be 1.0 to 2.0 g/cc.

A M2/M1 ratio, which is a ratio of mass M2 of silicon compounds ($SiO_x$ particles) contained in the upper layer portion of the negative electrode active material layer to mass M1 of silicon compounds ($SiO_x$ particles) contained in the lower layer portion of the negative electrode active material layer, can be obtained as follows.

First, a cross-section of the negative electrode active material layer is observed under an SEM (scanning electron microscope) and quantitative mapping is performed by energy dispersive X-ray spectroscopy. Through this step, elemental contents of the negative electrode active material layer are measured at each scanning position in the cross-section to obtain the elemental distribution. In a region within the cross-section, for example, Si content in the region is obtained by integrating the Si elemental distribution.

Si content is obtained in each region corresponding to the upper layer portion (and lower layer portion) in the cross-section. The content (mass) of silicon compounds ($SiO_x$ particles) contained in the lower layer portion of the negative electrode active material layer is set as M1, whereas the content (mass) of silicon compounds ($SiO_x$ particles) contained in the upper layer portion of the negative electrode active material layer is set as M2. A ratio of Si content in the region corresponding to the upper layer portion in the cross-section to Si content in the region corresponding to the lower layer portion in the cross-section is equivalent to M2/M1 (unless the ratio x in $SiO_x$ particles is different between the upper layer portion and the lower layer portion).

In the following, an exemplary embodiment of the present invention will be described in detail with reference to the drawings. The drawings referred to in the description of the embodiment are schematically illustrated, and dimensional ratios and the like of the components described in the drawings are different from actual ones in some cases. Specific dimensional ratios and the like should be determined by taking into account the following description.

FIG. 1 is a schematic front cross-sectional view illustrating the configuration of a secondary battery 100 as an exemplary embodiment. In the present specification, the vertical direction on the paper plane of FIG. 1 is referred to as "height direction", a stacking direction of a positive electrode 11 and a negative electrode 12 in an electrode assembly 10 described hereinafter is referred to as "stacking direction", and a direction perpendicular to each of the height direction and the stacking direction is referred to as "longitudinal direction". Moreover, in the present specification, the term "end" refers to the end and its neighborhood in an object.

As in FIG. 1, the secondary battery 100 includes the electrode assembly 10 having the positive electrode 11 and the negative electrode 12, a case 2 as a package that houses the electrode assembly 10 and an electrolyte solution (not shown) together, and a lid 3 that covers a top opening of the case 2.

The secondary battery 100 further includes an insulation holder 4 that covers the outer surface of the electrode assembly 10 and that is disposed between the electrode assembly 10 and the case 2, a current collector member 5a connected to the positive electrode 11, a current collector member 5b connected to the negative electrode 12, a terminal 6a that is connected to the current collector member 5a and whose portion extends through a terminal hole 3a of the lid 3 to be exposed outside the case 2, and a terminal 6b that is connected to the current collector member 5b and whose portion extends through a terminal hole 3b of the lid 3 to be exposed outside the case 2. The secondary battery 100 still further includes a lower insulation member 7a that is disposed between the current collector member 5a and the lid 3 to insulate the lid 3 from the current collector member 5a, a lower insulation member 7b that is disposed between the current collector member 5b and the lid 3 to insulate the lid 3 from the current collector member 5b, an upper insulation member 8a that is disposed between the terminal 6a and the lid 3 to insulate the lid 3 from the terminal 6a, and an upper insulation member 8b that is disposed between the terminal 6b and the lid 3 to insulate the lid 3 from the terminal 6b.

The electrode assembly 10 has, for example, a structure composed of a plurality of positive electrodes 11 and a plurality of negative electrodes 12 alternately stacked via separators (not shown). The electrode assembly used for a secondary battery of the present disclosure, however, is not limited to such a stacked structure. The electrode assembly may have a rolled structure of a positive electrode strip and a negative electrode strip via a separator strip. Moreover, the electrode assembly may have a zigzag structure prepared by forming stacked strips composed of a positive electrode strip, a negative electrode strip, and a separator strip disposed therebetween, and by bending the stacked strips.

The case 2 is a metal can of a flat-bottomed square tube, for example. The lid 3 is a metal sheet, for example. The case 2 and the lid 3 may be formed, for example, from aluminum as a main component. The opening of the case 2 and the periphery of the lid 3 are joined by welding, for example. Through such joining, the case 2 is sealed with the lid 3.

In the lid 3, terminal holes 3a and 3b for inserting the terminals 6a and 6b, a liquid feed port 3c, and an exhaust valve 3d are formed. The liquid feed port 3c is a through hole used for feeding an electrolyte solution into the case 2 after the case 2 is sealed with the lid 3. The liquid feed port 3c is sealed with a liquid feed plug 9 after an electrolyte solution is fed. The liquid feed plug may be made from metal or a resin, for example. The exhaust valve 3d is a brittle portion that is broken to prevent explosion of the secondary battery 100, for example, when the pressure inside the secondary battery 100 increases due to gas generated inside the secondary battery 100. The exhaust valve 3d is configured from a plurality of linear grooves formed on the top surface of the lid 3, for example. During operation, the exhaust valve 3d is torn along the grooves and gas inside the case 2 is discharged from the torn portion. An exhaust valve used for a secondary battery of the present disclosure is not limited to such a configuration, and a resettable exhaust valve in which an exhaust hole is plugged with a compressed elastic body may be used.

The insulation holder 4 is, for example, a housing that is formed by bending a resin sheet and that has an opening on the top surface. Further, the insulation holder may already be a flat-bottomed tubular case before bending.

The current collector members 5a and 5b are electrically connected to the positive electrode 11 and the negative electrode 12, respectively. The current collector members 5a and 5b are each formed from a metal sheet, for example. The current collector member 5a is formed from aluminum or aluminum alloy. The current collector member 5b is formed from copper or copper alloy, for example. Between the lid 3 and the current collector members 5a and 5b, sheet-like lower insulation members 7a and 7b are disposed, respectively. In each of the current collector members 5a and 5b and the lower insulation members 7a and 7b, insertion holes 5a1, 5b1, 7a1, and 7b1 (not shown) for inserting the respective terminals 6a and 6b are formed. The lower portion of the terminal 6a extends through the insertion holes 5a1 and 7a1 while the leading end of the lower portion is swaged on the current collector member 5a, thereby fixing the current collector member 5a and the lower insulation member 7a to the lid 3. Moreover, the lower portion of the terminal 6b extends through the insertion holes 5b1 and 7b1 while the leading end of the lower portion is swaged on the current collector member 5b, thereby fixing the current collector member 5b and the lower insulation member 7b to the lid 3. For example, flanges are formed in portions of the terminals 6a and 6b exposed from the top surface of the lid 3. The upper insulation member 8a is disposed between the terminal 6a and the terminal hole 3a as well as between the flange of the terminal 6a and the lid 3. The upper insulation member 8b is disposed between the terminal 6b and the terminal hole 3b as well as between the flange of the terminal 6b and the lid 3. The lower insulation members 7a and 7b and the upper insulation members 8a and 8b may be formed from insulating resins, for example.

The electrode assembly 10 includes a plurality of planar positive electrodes 11, a plurality of planar negative electrodes 12, and a plurality of separators. Such separators may be each formed by bending a long porous resin sheet in a pleated manner. In the embodiment, the separators are each inserted between the positive electrode 11 and the negative electrode 12. The electrode assembly 10 is a stacked electrode assembly formed by stacking the positive electrodes 11 and the negative electrodes 12 via separators. For example, all the positive electrodes 11, the negative electrodes 12, and the separators have almost rectangular shapes, and the resulting stacked electrode assembly 10 has an almost rectangular parallelepiped shape. The negative electrodes 12 are formed in one size larger than the positive electrodes 11 in view of acceptance of lithium during charging.

(Positive Electrode)

The positive electrode 11 includes a sheet core (positive electrode current collector) and a positive electrode mixture layer (positive electrode active material layer) formed on the core. For the core of the positive electrode 11, a foil of metal that is stable in a potential range of the positive electrode, such as aluminum, a film having such metal placed as a surface layer, and so forth may be used. As a core material, stainless steel, aluminum, aluminum alloy, or titanium, for example, may be used. The positive electrode mixture layer may contain, as necessary, an electric conductor, a binder, a thickening agent, and the like in addition to a positive electrode active material. The positive electrode mixture layer is preferably formed on each side of the core.

In the positive electrode 11, a tab is formed from a portion of the core protruded from the top side of the core. Here, an insulating layer or a protective layer having a higher electric resistance than the positive electrode current collector is preferably provided in a contact part between the tab and a rectangular region where the positive electrode mixture layer has been formed. The tab of the positive electrode 11 may be a separate member formed from a material same as or different from the positive electrode current collector, and a tab as a separate member may be joined to the core by welding or the like.

For positive electrode active materials, lithium-metal complex oxides are preferably used. A metal element as a constituent of lithium-metal complex oxides is, for example, at least one selected from Mg, Al, Ca, Sc, Ti, V, Cr, Mn, Fe, Co, Ni, Cu, Zn, Ga, Ge, Y, Zr, Sn, Sb, W, Pb, and Bi. Among these elements, at least one selected from Co, Ni, Mn, and Al is preferably contained. Examples of suitable lithium-metal complex oxides include Co-, Ni-, and Mn-containing lithium-metal complex oxides and Co-, Ni-, and Al-containing lithium-metal complex oxides.

Especially, lithium nickel complex oxide represented by $Li_aNi_bM_{1-b}O_2$ (M is at least one selected from the group consisting of Mn, Co, and Al; $0<a\leq1.2$; $0.3\leq b\leq1$) may preferably be used. Here, the value a representing a molar ratio of lithium is a value immediately after preparation of an active material and the value increases or decreases through charging and discharging.

Specific examples of such lithium nickel complex oxide include lithium nickel cobalt manganese complex oxide ($LiNi_{0.5}Co_{0.2}Mn_{0.3}O_2$, $LiNi_{1/3}Co_{1/3}Mn_{1/3}O_2$, $LiNi_{0.4}Co_{0.2}Mn_{0.4}O_2$, and the like) represented by $LiNi_bCo_cMn_dO_2$ (b, c, and d satisfy b+c+d=1), lithium nickel manganese complex oxide ($LiNi_{0.5}Mn_{0.5}O_2$ and the like), lithium nickel cobalt complex oxide ($LiNi_{0.5}Co_{0.2}O_2$ and the like), and lithium nickel cobalt aluminum complex oxide ($LiNi_{0.5}Co_{0.15}Al_{0.05}O_2$, $LiNi_{0.5}Co_{0.18}Al_{0.02}O_2$, $LiNi_{0.9}Co_{0.05}Al_{0.05}O_2$, and the like).

Examples of the binder include resin materials, for example, fluororesins, such as polytetrafluoroethylene and polyvinylidene fluoride (PVdF); polyolefins, such as polyethylene and polypropylene; polyamide resins such as aramid resins; polyimide resins, such as polyimides and polyamideimides; acrylic resins, such as polyacrylic acid, polymethyl acrylate, and ethylene-acrylic acid copolymer; vinyl resins, such as polyacrylonitrile and polyvinyl acetate; polyvinylpyrrolidone; polyether sulfones; and rubber materials, such as styrene-butadiene copolymer rubber (SBR). These binders may be used alone or in combination.

Examples of the electric conductor include carbon black, such as acetylene black, furnace black, or Ketjen black; conductive fibers, such as carbon fibers and metal fibers; fluorinated carbon; metal powders, such as aluminum; conductive whiskers, such as zinc oxide and potassium titanate; conductive metal oxides, such as titanium oxide; and organic conductive materials, such as phenylene derivatives. As the electric conductor, graphite, such as natural graphite or artificial graphite, may be used. These electric conductors may be used alone or in combination.

Examples of the thickening agent include cellulose derivatives (cellulose ethers and the like), such as carboxymethyl cellulose (CMC) or modified carboxymethyl cellulose (including salts, such as Na salt) and methyl cellulose; saponified polymers having vinyl acetate units, such as polyvinyl alcohol; and polyethers (polyalkylene oxides, such as polyethylene oxide, and the like). These thickening agents may be used alone or in combination.

The positive electrode mixture layer can be formed by applying a positive electrode slurry containing a positive electrode mixture dispersed in a dispersion medium to a surface of the core (positive electrode current collector), followed by drying. A coating film after drying may be rolled as necessary. The dispersion medium is not particularly limited, and the examples include water; alcohols, such as ethanol; ethers, such as tetrahydrofuran; amides, such as dimethylformamide; N-methyl-2-pyrrolidone (NMP), and mixed solvents thereof.

(Negative Electrode)

The negative electrode 12 includes a sheet core (negative electrode current collector) and a negative electrode mixture layer (negative electrode active material layer) formed on the core. For the core of the negative electrode 12, a foil of metal that is stable in a potential range of the negative electrode, such as copper, a film having such metal placed as a surface layer, and so forth may be used. As a core material, stainless steel, nickel, nickel alloy, copper, or copper alloy, for example, may be used. The negative electrode mixture layer may contain, as necessary, an electric conductor, a binder, a thickening agent, and the like in addition to a negative electrode active material. The negative electrode mixture layer is preferably formed on each side of the core. In a similar manner to the positive electrode mixture layer, the negative electrode mixture layer can be formed by applying a negative electrode slurry containing a negative electrode mixture dispersed in a dispersion medium to the surface of the core (negative electrode current collector), followed by drying. A coating film after drying may be rolled as necessary.

In the negative electrode 12, a negative electrode tab formed from a portion of the negative electrode current collector protruded from the top side of the core, which is a longitudinal direction end different from an end where the positive electrode tab is provided. The negative electrode tab may be a separate member formed from a material same as or different from the core and may be joined to the core by welding or the like.

The negative electrode mixture layer contains negative electrode active materials of the above-described carbon material and silicon compounds as essential components and may contain a binder, an electric conductor, a thickening agent, and the like as optional components. Si particles contained in silicon compounds can absorb many lithium ions, thereby contributing to an enhanced capacity of the negative electrode.

Meanwhile, the volume of silicon compounds as negative electrode active materials swells and contracts through charging and discharging. Accordingly, as their ratio in the negative electrode active materials increases, contact failure between the negative electrode active material layer and the negative electrode current collector tends to arise through charging and discharging. By using silicon compounds and a carbon material together, it becomes possible to achieve excellent charge acceptance performance, even in rapid charging, while imparting the high capacity of Si particles to the negative electrode. The percentage of silicon compounds in the total of the silicon compounds and a carbon material is, for example, 3 to 15 mass % and preferably 3 to 10 mass %. By such a percentage, both enhanced capacity and improved rapid charging performance can readily be achieved.

The content of silicon compounds in the negative electrode mixture layer is distributed in the thickness direction of the negative electrode mixture layer in which the mass-based content is lower in a region nearer the outer surface that does not face the negative electrode current collector and the mass-based content is higher in a region farther from the outer surface. By varying the content percentage of silicon compounds in the negative electrode mixture layer in the thickness direction and by including fluoroethylene carbonate in an electrolyte solution, a secondary battery having a suppressed decrease in capacity during rapid charging as well as excellent charge acceptance performance can be realized. As a method of varying the content percentage of silicon compounds in the thickness direction of the negative electrode mixture layer, the negative electrode mixture layer may be formed by preparing a plurality of negative electrode slurries having different mixing percentages of silicon compounds in the total negative electrode mixture, applying the negative electrode slurries to the negative electrode current collector a plurality of times, and drying. By this method, a negative electrode mixture layer having a multilayer structure with a different content of silicon compounds for each layer can be formed.

For example, a lower layer slurry and an upper layer slurry are prepared as negative electrode slurries while the mixing percentage of silicon compounds in the entire negative electrode mixture is set to be higher for the lower layer slurry than for the upper layer slurry. A negative electrode mixture layer including two layers having different content percentages of silicon compounds may be formed by applying the lower layer slurry to the core (negative electrode current collector) by using a coater, applying the upper layer slurry to the lower layer slurry by using a coater, and drying the upper layer slurry and lower layer slurry. Alternatively, an upper layer of the negative electrode mixture layer may be formed by applying the lower layer slurry, drying the lower layer slurry to form a lower layer of the negative electrode mixture layer, then applying the upper layer slurry to the lower layer, and drying the upper layer slurry.

Figure 2:
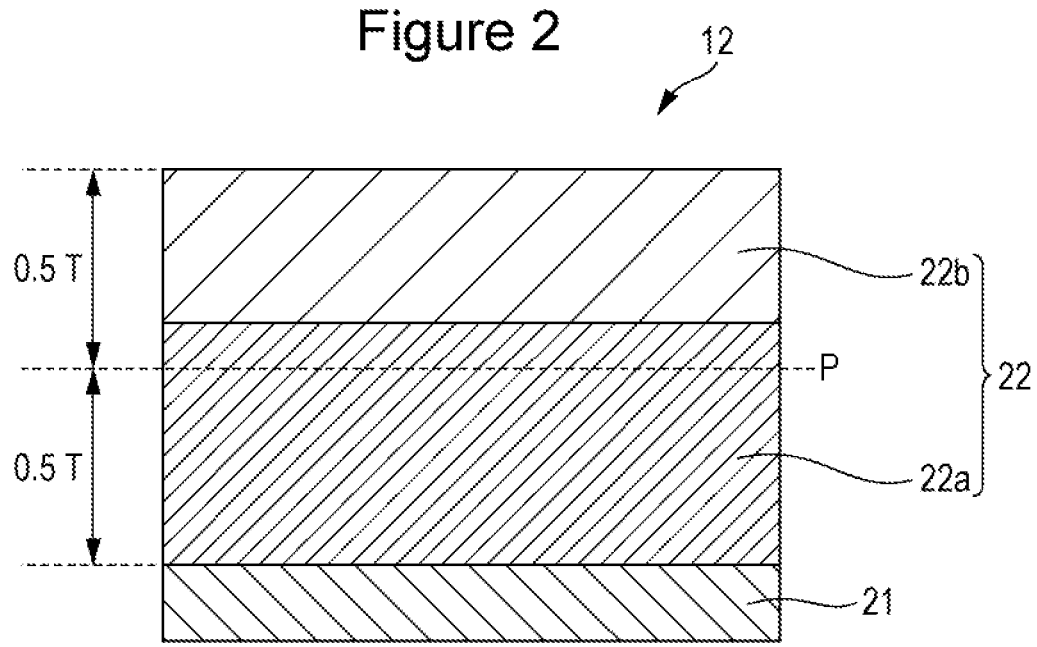
FIG. 2 is a cross-sectional view in the thickness direction of a negative electrode according to the embodiment.

As an example, FIG. 2 illustrates a cross-sectional view of the negative electrode 12 of the embodiment in the thickness direction. The negative electrode 12 includes a negative electrode current collector 21 and a negative electrode mixture layer 22 (22*a*, 22*b*) formed on the negative electrode current collector 21. In the example of FIG. 2, the negative electrode mixture layer 22 is formed on one side of the negative electrode current collector 21, but the negative electrode mixture layer 22 may be formed on both sides of the negative electrode current collector 21.

The negative electrode mixture layer 22 is composed of stacked two layers (lower mixture layer 22a and upper mixture layer 22b) having different content percentages of silicon compounds. The lower mixture layer 22a faces and comes into contact with the negative electrode current collector 21, and the outer surface of the upper mixture layer 22b constitutes the outer surface of the negative electrode mixture layer 22. The mass-based content percentage of silicon compounds in the lower mixture layer 22a is larger than the mass-based content percentage of silicon compounds in the upper mixture layer 22b. The thickness of the lower mixture layer 22a and that of the upper mixture layer 22b need not be the same. In other words, the boundary between the lower mixture layer 22a and the upper mixture layer 22b in the negative electrode mixture layer 22 may be on the outer surface side or on the negative electrode current collector side of a 0.5T position from the outer surface of the negative electrode mixture layer (0.5T position from the contact surface of the negative electrode mixture layer with the negative electrode current collector) P, where the total thickness of the negative electrode mixture layer 22 is set as T. In either case, however, when a region on the negative electrode current collector side of the position P in the negative electrode mixture layer is set as a lower layer portion (may include the upper mixture layer 22b in addition to the lower mixture layer 22a) and a region on the outer surface side of the position P in the negative electrode mixture layer (may include the lower mixture layer 22a in addition to the upper mixture layer 22b) is set as an upper layer portion, mass M1 of silicon compounds contained in the lower layer portion may be larger than mass M2 of silicon compounds contained in the upper layer portion.

For the binder, electric conductor, and thickening agent, the same materials described concerning the positive electrode may be used. For the binder, styrene-butadiene rubber (SBR), carboxymethyl cellulose (CMC) or a salt thereof, polyacrylic acid (PAA) or a salt thereof, or polyvinyl alcohol (PVA), for example, may be used.

(Separator)

In general, it is desirable to dispose a separator between a positive electrode and a negative electrode. A separator has high ion permeability, appropriate mechanical strength, and appropriate insulating properties. For such a separator, a microporous membrane, a woven fabric, and a porous sheet, such as a nonwoven fabric, may be used. As a material for the separator, polyolefins, such as polyethylene and polypropylene, cellulose, and the like are preferable. The separator may have either a single-layer structure or a multilayer structure. Moreover, on the surface of the separator, a porous layer containing inorganic compound fillers, a porous layer formed from a highly heat-resistant resin, such as aramid resins, or the like may be formed. Further, the separator may have adhesive layers formed by applying an adhesive to the surfaces facing the positive electrode 11 and the negative electrode 12, thereby bonding/fixing the positive electrode 11, the negative electrode 12, and the separator.

In the embodiment, a tab group is formed by stacking tab ends of the negative electrodes 12. The tab group of the negative electrodes 12 is bent to form a flat portion facing the sheet-like current collector member 5b. The flat portion is joined and electrically connected with the bottom surface of the current collector member 5b. For joining the current collector member 5b with the tab group, a welding method, such as ultrasonic welding, resistance welding, or laser welding, may be employed. As for the tabs of the positive electrodes 11, a positive electrode tab group is bent and joined with the bottom surface of the current collector member 5a in a similar manner.

When the number of stacked electrode sheets increases in the electrode assembly 10, handling of the tabs becomes difficult inside the secondary battery 100, thereby making it difficult to increase volume energy density of the secondary battery 100. However, by housing, in the secondary battery 100, two or more electrode assembly elements each composed of an appropriate number of stacked electrodes, it becomes possible to make handling of the tabs easy and to increase volume energy density of the secondary battery 100.

An exemplary structure of a secondary battery is not limited to the configuration illustrated in FIG. 1, and other embodiments, such as a structure in which an electrolyte solution and an electrode group that is formed by rolling a positive electrode and a negative electrode via a separator are housed in a package, may be employed. A secondary battery may be in any form, such as a cylindrical type, square type, coin type, button type, or laminate type.

Hereinafter, an electrolyte solution will be described in detail.

(Electrolyte Solution)

An electrolyte solution contains nonaqueous solvents and an electrolyte salt dissolved in the nonaqueous solvents. The electrolyte salt is a lithium salt, for example. The electrolyte solution may contain publicly known additives.

Examples of the nonaqueous solvents include cyclic carbonates, linear carbonates, and linear carboxylic esters. These solvents may be fluorinated solvents in which hydrogen atoms are partially substituted with fluorine atoms.

The electrolyte solution contains fluoroethylene carbonate (FEC) as a cyclic carbonate. By including FEC, deposition of lithium during charging can be specifically suppressed. Examples of FEC include 4-fluoroethylene carbonate (monofluoroethylene carbonate), 4,5-difluoroethylene carbonate, 4,4-difluoroethylene carbonate, 4,4,5-trifluoroethylene carbonate, and 4,4,5,5-tetrafluoroethylene carbonate. Among these FEC, 4-fluoroethylene carbonate is particularly preferable. The content of FEC may be, for example, 10% or more, 12% or more, and preferably 15% or more based on the total volume of nonaqueous solvents at 25° C. Meanwhile, the content of FEC is, for example, 40% or less and preferably 25% or less based on the total volume of nonaqueous solvents at 25° C. When the content of FEC is less than 10 volume %, a satisfactory suppressive effect on lithium deposition cannot be obtained. Meanwhile, when the content of FEC exceeds 40 volume %, the viscosity of an electrolyte solution increases, and charging and discharging characteristics tend to deteriorate.

More preferably, an electrolyte solution may contain fluoroethylene carbonate (FEC), a linear carboxylic ester, and a linear carbonate. By using such an electrolyte solution, deposition of lithium during charging can be specifically suppressed while keeping flammability during battery leakage low.

Two or more linear carboxylic esters may be used together.

Such a linear carboxylic ester is of preferably the carbon number of 5 or less. By combining a linear carboxylic ester of the carbon number of 5 or less with fluoroethylene carbonate (FEC) and by adding to an electrolyte solution, a suppressive effect on lithium deposition can be enhanced. Examples of linear carboxylic esters that satisfy the above-mentioned condition include methyl acetate, ethyl acetate, propyl acetate, methyl propionate (MP), and ethyl propionate (EP). Among these, ethyl propionate (EP) is preferable, and substantially using EP alone is more preferable.

The content of a linear carboxylic ester may be 15 to 40% based on the total volume of nonaqueous solvents at 25° C. By setting the content of a linear carboxylic ester to 15 volume % or more, combining the linear carboxylic ester with fluoroethylene carbonate (FEC), and adding the combined solvents to an electrolyte solution, a suppressive effect on lithium deposition can be enhanced. Meanwhile, when the content of a linear carboxylic ester exceeds 40 volume %, it becomes difficult to keep flammability low. From a viewpoint of keeping flammability during battery leakage low, the content of a linear carboxylic ester may be 40 volume % or less.

Examples of the cyclic carbonates include, in addition to fluoroethylene carbonate (FEC), ethylene carbonate (EC), propylene carbonate (PC), butylene carbonate, vinylene carbonate, vinyl ethylene carbonate, and derivatives thereof. The cyclic carbonates may be used alone or in combination. In view of ionic conductivity of an electrolyte solution, at least one from the group consisting of ethylene carbonate and propylene carbonate is preferably used. In this group, PC is particularly preferable.

Examples of the linear carbonates include dimethyl carbonate (DMC), ethyl methyl carbonate (EMC), diethyl carbonate (DEC), methyl propyl carbonate, ethyl propyl carbonate, and methyl isopropyl carbonate. Among these, DMC and EMC are particularly preferable. Such a linear carbonate may be used to control reduction reactions of a linear carboxylic ester on a negative electrode surface and to suppress an increase in negative electrode film resistance.

Other examples of nonaqueous solvents include cyclic carboxylic esters; cyclic ethers; linear ethers; nitriles, such as acetonitrile; amides, such as dimethylformamide; and halogenated solvents thereof in which hydrogen is substituted with halogen atoms, such as fluorine.

Examples of the cyclic ether includes 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methylfuran, 1,8-cineol, and crown ethers.

Examples of the linear ethers include 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, and tetraethylene glycol dimethyl ether.

Examples of the cyclic carboxylic esters include γ-butyrolactone (GBL) and γ-valerolactone (GVL).

These solvents may be used alone or in combination.

Further preferably, nonaqueous solvents may contain at least one selected from PC, EMC, and DMC, in addition to FEC and a linear carboxylic ester of the carbon number of 5 or less. In this case, it is possible to keep flammability low and suppress lithium deposition while maintaining satisfactory charging and discharging characteristics. When FEC and one or more cyclic carbonates other than FEC are used together, the mixing percentage of the total cyclic carbonates may be, for example, 35 volume % or less, 25 volume % or less, or 20 volume % or less, relative to nonaqueous solvents.

Preferable examples of nonaqueous solvents includes those containing FEC, EP, PC, EMC, and DMC. In this case, the total content of FEC and EP may be 25 to 80 volume % and more preferably 35 to 60 volume % based on the total volume of nonaqueous solvents. A nonaqueous electrolyte solution may contain 20 to 75 volume % of at least one selected from PC, EMC, and DMC based on the total volume of nonaqueous solvents.

Examples of the lithium salt includes lithium salts of chlorine-containing acids ($LiClO_4$, $LiAlCl_4$, $LiB_{10}Cl_{10}$, and the like), lithium salts of fluorine-containing acids ($LiPF_6$, $LiBF_4$, $LiSbF_6$, $LiAsF_6$, $LiCF_3SO_3$, $LiCF_3CO_2$, $Li(P(C_2O_4)F_4)$, $LiPF_{6-x}(C_nF_{2n+1})_x$ ($1<x<6$, $n=1$ or $2$), and the like), lithium salts of fluorine-containing acid imides ($LiN(SO_2CF_3)_2$, $LiN(C_lF2_{l+1}SO_2)(C_mF_{2m+1}SO_2)$ [$l$, $m$=integer of 0 or greater], and the like), lithium halides (LiCl, LiBr, LiI, and the like), LiSCN, chloroborane lithium complex, lower aliphatic carboxylic acid lithium salts, and borates, such as $Li_2B_4O_7$ and $Li(B(C_2O_4)F_2)$. The lithium salt may be used alone or in combination. Among these lithium salts, $LiPF_6$ is preferably used in view of ionic conductivity, electrochemical stability, and the like. The concentration of the lithium salt is 0.8 mol to 1.8 mol per L of nonaqueous solvents, for example.

Hereinafter, the present invention will be specifically described in accordance with the Examples. The present invention, however, is not limited to the Examples below.

<Battery A1>

(Fabrication of Positive Electrode)

As a positive electrode active material, a lithium-metal complex oxide represented by $LiNi_{0.55}Mn_{0.20}Co_{0.25}O_2$ was used. A positive electrode mixture slurry was prepared by mixing the positive electrode active material, acetylene black, and PVdF in a mass ratio of 100:1:1 and by adding NMP to the resulting mixture. The positive electrode mixture slurry was then applied to both sides of a positive electrode current collector formed from an aluminum foil, and the resulting coating films were dried. Subsequently, the coating films (positive electrode mixture layers) were rolled by a roll press. A positive electrode having the mixture layer formed on each side of the current collector was obtained by cutting into a predetermined electrode size later.

(Fabrication of Negative Electrode)

A lower layer slurry Y1 was prepared by mixing 88.2 parts by mass of graphite as a carbon material, 9.0 parts by mass of $SiO_x$ particles (x=0.94), 0.9 part by mass of PAA lithium salt (PAA-Li), 0.9 part by mass of CMC sodium salt (CMC-Na), and 0.9 part by mass of SBR, and adding an appropriate amount of water to the resulting mixture. Subsequently, an upper layer slurry X1 was prepared by mixing 96.9 parts by mass of graphite as a carbon material, 1 part by mass of PAA lithium salt, 1 part by mass of CMC sodium salt, and 1 part by mass of SBR, and adding an appropriate amount of water to the resulting mixture.

Next, a negative electrode active material layer comprising a lower layer and an upper layer was formed on each side of a core by applying the lower layer slurry Y1 to both sides of a negative electrode current collector formed from a copper foil except for portions to which leads are to be connected, applying the upper layer slurry X1 to the lower layer slurry Y1, and drying the slurries. A ratio of the amount applied (ratio of solids content) of the lower layer slurry Y1 to that of the upper layer slurry X1 was set to 65:35. A negative electrode E1 in which the negative electrode active material layers each have a two-layered structure with different SiO$_x$ content percentages was obtained by rolling coating films with a roller and cutting into a predetermined electrode size.

When: the total thickness of the negative electrode active material layer was set as T; a region from a surface facing the negative electrode current collector (contact surface with the negative electrode current collector) to a depth of 0.5T of the negative electrode active material layer was set as a lower layer portion; and a region from an outer surface to a depth of 0.5T of the negative electrode active material layer was set as an upper layer portion, M2/M1, which is a ratio of mass M2 of SiO$_x$ particles contained in the upper layer portion to mass M1 of SiO$_x$ particles contained in the lower layer portion, was 0.3. In the calculation of M2/M1, the mass of SiO$_x$ particles was obtained by excluding the contribution of carbon films that covered the SiO$_x$ particles.

(Preparation of Electrolyte Solution)

A nonaqueous electrolyte solution was prepared by adding LiPF$_6$ at a concentration of 1.0 mol/L to a mixed solvent prepared by mixing FEC, EC, EP, EMC, and DMC at 25° C. in a volume ratio of 25:0:29:11:35.

(Fabrication of Cell for Evaluation)

A stacked-type electrode assembly was fabricated by alternately stacking the prepared 8 positive electrodes and 9 negative electrodes via separators such that the negative electrodes were positioned on the outer sides. As the separators, polypropylene separators were used. A test cell was fabricated by inserting the electrode assembly into a package formed from an aluminum laminated sheet, feeding the nonaqueous electrolyte solution into the package, and sealing the opening of the package.

A secondary battery A1 having a capacity at 1C of 600 mAh was thus fabricated.

<Batteries A2 to A13, B1 to B10, and C1 to C4>

In the fabrication of negative electrodes, lower layer slurries Y2 to Y5 were prepared by changing mixing percentages of graphite, SiO$_x$ particles, PAA-Li, CMC-Na, and/or SBR in the lower layer slurry Y1. In a similar manner, upper layer slurries X2 to X5 were prepared by changing mixing percentages of graphite, SiO$_x$ particles, PAA-Li, CMC-Na, and/or SBR in the upper layer slurry X1. Negative electrodes E2 to E5 in which each negative electrode active material layer has a two-layered structure with different content percentages of SiO$_x$ were obtained in a similar manner to the negative electrode E1 by combining the lower layer slurries Y2 to Y5 with the upper layer slurries X2 to X5.

Table 1 shows mixing percentages of graphite, SiO$_x$ particles, PAA-Li, CMC-Na, and SBR of the lower layer slurries and upper layer slurries used for the fabrication of the negative electrodes E1 to E5. Table 1 also shows M2/M1, which is a ratio of the mass of SiO$_x$ particles contained in the upper layer portion of the negative electrode active material layer to the mass of SiO$_x$ particles contained in the lower layer portion of the negative electrode active material layer. Here, the lower layer slurry Y5 has the same composition as the upper layer slurry X5. The negative electrodes E1 to E4 each have different content percentages of SiO$_x$ particles in the upper layer portion and the lower layer portion of the negative electrode active material layer. The negative electrodes E1 to E5, however, have almost the same content percentages of graphite, SiO$_x$ particles, PAA-Li, CMC-Na, and SBR in the negative electrode active material layer as a whole.

Further, in the preparation of electrolyte solutions, a plurality of electrolyte solutions having different mixing percentages of nonaqueous solvents were prepared by varying mixing ratios of FEC, EC, EP, EMC, and DMC. Batteries A1 to A13, batteries B1 to B10, and batteries C1 to C4 were fabricated by using the prepared electrolyte solutions and the negative electrodes E1 to E5. Table 2 shows combinations of a negative electrode used in each battery and a mixing percentage (volume %) of FEC in nonaqueous solvents. In batteries A1 to A13, the mixing percentages of EP, EMC, and DMC were constant at 29 volume %, 11 volume %, and 35 volume %, respectively, relative to nonaqueous solvents, and the mixing percentage of EC was decreased (or increased) as the mixing percentage of FEC was increased (or decreased). In batteries B1 to B10, the mixing percentages of EP, EMC, and DMC were constant at 29 volume %, 16 volume %, and 35 volume %, respectively, relative to nonaqueous solvents, and the mixing percentage of EC was decreased (or increased) as the mixing percentage of FEC was increased (or decreased). In batteries C1 to C4, PC was used in place of EC. Concerning the mixing percentages of FEC, PC, EP, EMC, and DMC in nonaqueous solvents, the mixing percentages of PC, EP and DMC were 3 volume %, 29 volume %, and 35 volume %, respectively, relative to nonaqueous solvents in the batteries C1 and C3, 5 volume %, 29 volume %, and 35 volume %, respectively, relative to nonaqueous solvents in the batteries C2 and C4, and the mixing percentage of EMC was varied in accordance with the mixing percentage of FEC.

(Evaluation of Batteries)

Each of the batteries A1 to A13, B1 to B10, C1 to C4 was subjected to constant-current charging at 2.25C to 4.3V, followed by discharging at 0.1C to a battery voltage of 2.5V.

A difference Q1–Q2 between a charge capacity Q1 in charging at 2.25C and a discharge capacity Q2 at 0.1C was obtained and regarded as an irreversible capacity. The irreversible capacity of each battery was evaluated as a relative value based on the irreversible capacity of 100 for the battery A13. Moreover, each battery after the test was disassembled to take out the negative electrode, and the presence or absence of deposition of metallic lithium was visually observed.

The evaluation results are shown in Table 2. As shown in Table 2, the irreversible capacity was dramatically decreased in the batteries A1 to A3, A6, A7, A10, B1 to B3, B6, B7, B10, and C1 to C4 in which an upper layer slurry and a lower layer slurry having different mixing ratios of silicon compounds (SiO$_x$ particles) were used and the content percentage of FEC in nonaqueous solvents was 10 volume % or more. In these batteries, no deposition of metallic lithium was observed. Further, concerning negative electrodes, the irreversible capacity was revealed to be particularly decreased in the batteries using the negative electrodes E1, E2, and E3.

FIG. 3 shows the results in Table 2 as a graph. As shown in FIG. 3, an increase in irreversible capacity is particularly suppressed in a region where the FEC content percentage is 10 volume % or more.

TABLE 1

| Negative electrode | Upper layer slurry / Lower layer slurry | Graphite | SiO$_x$ | PAA-Li | CMC-Na | SBR | M2/M1 |
|---|---|---|---|---|---|---|---|
| E1 | X1 | 96.9 | 0.0 | 1.0 | 1.0 | 1.0 | 0.3 |
|    | Y1 | 88.2 | 9.0 | 0.9 | 0.9 | 0.9 |     |
| E2 | X2 | 94.5 | 2.5 | 1.0 | 1.0 | 1.0 | 0.5 |
|    | Y2 | 89.5 | 7.6 | 1.0 | 1.0 | 1.0 |     |
| E3 | X3 | 92.9 | 4.2 | 1.0 | 1.0 | 1.0 | 0.7 |
|    | Y3 | 90.4 | 6.7 | 1.0 | 1.0 | 1.0 |     |
| E4 | X4 | 92.1 | 5.0 | 1.0 | 1.0 | 1.0 | 0.9 |
|    | Y4 | 90.8 | 6.3 | 1.0 | 1.0 | 1.0 |     |
| E5 | X5 | 91.3 | 5.8 | 1.0 | 1.0 | 1.0 | 1.0 |
|    | Y5 | 91.3 | 5.8 | 1.0 | 1.0 | 1.0 |     |

TABLE 2

| Battery | Negative electrode | FEC (volume %) | Irreversible capacity | Li deposition |
|---|---|---|---|---|
| A1 | E1 | 25.0 | 0.2 | Absent |
| A2 | E1 | 20.0 | 7.4 | Absent |
| A3 | E1 | 15.0 | 15.0 | Absent |
| A4 | E1 | 5.2 | 71.8 | Present |
| A5 | E1 | 0.0 | 90.2 | Present |
| A6 | E2 | 25.0 | 2.0 | Absent |
| A7 | E2 | 20.0 | 13.0 | Absent |
| A8 | E2 | 5.2 | 75.0 | Present |
| A9 | E2 | 0.0 | 93.1 | Present |
| A10 | E3 | 25.0 | 4.0 | Absent |
| A11 | E3 | 0.0 | 95.0 | Present |
| A12 | E4 | 0.0 | 97.9 | Present |
| A13 | E5 | 0.0 | 100 | Present |
| B1 | E1 | 20.0 | 0.1 | Absent |
| B2 | E1 | 16.0 | 7.4 | Absent |
| B3 | E1 | 12.0 | 14.9 | Absent |
| B4 | E1 | 4.2 | 72.4 | Present |
| B5 | E1 | 0.0 | 90.8 | Present |
| B6 | E2 | 20.0 | 1.9 | Absent |
| B7 | E2 | 16.0 | 13.0 | Absent |
| B8 | E2 | 4.2 | 75.4 | Present |
| B9 | E2 | 0.0 | 93.6 | Present |
| B10 | E3 | 20.0 | 3.8 | Absent |
| C1 | E1 | 25.0 | 3.9 | Absent |
| C2 | E1 | 25.0 | 4.1 | Absent |
| C3 | E1 | 20.0 | 3.7 | Absent |
| C4 | E1 | 20.0 | 3.9 | Absent |

INDUSTRIAL APPLICABILITY

A secondary battery according to the present disclosure does not decrease the capacity, even through rapid charging, and has a high capacity, and hence is useful for driving power sources of electric vehicles (EV), hybrid electric vehicles (HEV, PHEV), and so forth, as well as main power sources of mobile communication devices, portable electronic devices, and so forth.

While detailed embodiments have been used to illustrate the present invention, to those skilled in the art, however, it will be apparent from the foregoing disclosure that various changes and modifications can be made therein without departing from the spirit and scope of the invention. Furthermore, the foregoing description of the embodiments according to the present invention is provided for illustration only, and is not intended to limit the invention.

What is claimed is:

1. A secondary battery comprising:
   a positive electrode, a negative electrode, and an electrolyte solution containing one or more nonaqueous solvents, wherein:
   the negative electrode includes a negative electrode current collector and a negative electrode active material layer formed on the negative electrode current collector;
   the negative electrode active material layer contains a carbon material and one or more silicon compounds;
   the nonaqueous solvents include fluoroethylene carbonate;
   a volume-based content percentage of fluoroethylene carbonate in the nonaqueous solvents is 15% or more and 40% or less;
   the negative electrode active material layer has a first surface facing the negative electrode current collector and a second surface being a back side of the first surface; and
   when: a thickness of the negative electrode active material layer is set as T; a region from the first surface to a depth of 0.5T of the negative electrode active material layer is set as a lower layer portion; and a region from the second surface to a depth of 0.5T of the negative electrode active material layer is set as an upper layer portion, mass M1 of the silicon compounds in the lower layer portion is larger than mass M2 of the silicon compounds in the upper layer portion.

2. The secondary battery according to claim 1, wherein M2/M1 is 0.8 or less.

3. The secondary battery according to claim 1, wherein:
   the negative electrode active material layer is composed of a plurality of layers;
   a mass-based content percentage of the silicon compounds in each layer of the plurality of layers is different from a mass-based content percentage of the silicon compounds in other layers; and
   the content percentage in a layer nearer the second surface of the negative electrode active material layer is smaller.

4. The secondary battery according to claim 3, wherein, among the plurality of layers of the negative electrode active material layer, a layer that forms the second surface does not contain the silicon compounds.

5. The secondary battery according to claim 1, wherein an average particle size (D50) of the carbon material is 1 to 15 μm.

6. The secondary battery according to claim 1, wherein the nonaqueous solvents include a linear carbonate.

7. The secondary battery according to claim 1, wherein the silicon compounds include silicon oxide SiO$_x$.

* * * * *